(12) United States Patent
Burton et al.

(10) Patent No.: US 7,451,661 B2
(45) Date of Patent: Nov. 18, 2008

(54) FRICTION STIR WELDING LOAD CONFIRMATION SYSTEM

(75) Inventors: Kurt A. Burton, Wildwood, MO (US); Mike P. Matlack, St. Charles, MO (US); Herb L. Bommer, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 571 days.

(21) Appl. No.: 11/161,731

(22) Filed: Aug. 15, 2005

(65) Prior Publication Data

US 2007/0034671 A1 Feb. 15, 2007

(51) Int. Cl.
*G01N 3/20* (2006.01)
(52) U.S. Cl. .......................................... 73/850; 73/818
(58) Field of Classification Search ................... 73/818, 73/850
See application file for complete search history.

(56) References Cited

U.S. PATENT DOCUMENTS

| | | | |
|---|---|---|---|
| 3,675,953 A * | 7/1972 | Glatz | 403/90 |
| 5,237,311 A * | 8/1993 | Mailey et al. | 345/167 |
| 5,718,366 A | 2/1998 | Colligan | |
| 5,794,835 A | 8/1998 | Colligan et al. | |
| 5,801,339 A * | 9/1998 | Boult | 177/261 |
| 6,050,475 A * | 4/2000 | Kinton et al. | 228/112.1 |
| 6,367,681 B1 | 4/2002 | Waldron et al. | |
| 6,490,939 B1 * | 12/2002 | Sargent | 73/866.5 |
| 6,908,690 B2 | 6/2005 | Waldron et al. | |

* cited by examiner

*Primary Examiner*—Max Noori
(74) *Attorney, Agent, or Firm*—Ostrager Chong Flaherty & Broitman P.C.

(57) ABSTRACT

A portable multi-axis load confirmation tool having a rotating ball on the end thereof follows a three-dimensional weld program path therewith. The ball reacts to an internal load cell for verifying weld program path dynamics before an actual program is run with friction stir welding tools. The load cell is connected to instrumentation electronics converting a load cell signal to a digital readout and comparing the load cell signal to weld program load requirements. The tool integrates into a tool holder loaded on a friction stir welding spindle for simulating an actual friction stir welding tool.

11 Claims, 2 Drawing Sheets

FRICTION STIR WELDING LOAD CONFIRMATION SYSTEM

TECHNICAL FIELD

The present invention relates generally to welding systems, and more particularly to a five-axis load confirmation tool for a friction stir welding system.

BACKGROUND OF THE INVENTION

Friction welding is a process by which metals, and/or other materials, are joined by heat, which is generated when the parts are rubbed together under high pressure. The advantages of friction welding include very rapid completion rates, good mechanical properties, and the elimination of the need for shielding gases under most circumstances. There are at least twenty variants of friction welding processes. Some of those variants include rotary friction welding, friction stud welding, radial friction welding, linear friction welding, orbital friction welding, third-body friction welding, and friction taper plug welding.

Friction stir welding is a relatively new friction welding process. It involves rotating a small tool between two closely butted components. Frictional heating causes the materials in the components to soften and the forward motion of the tool forces material from the front of the tool to the back, where it consolidates to form a solid-state weld. Stir welding processes thus combine the flexibility of mechanized arc welding with the desirable results of friction welding.

One particular benefit of friction stir welding is that the formation of the weld or joint is autogenous and is created by the solidification of plasticized parent materials rather than a filler material, as is commonly used in conventional welding processes. In addition, the friction stir weld joint includes a nugget having a refined grain structure with grains having an equiaxed shape and grain sizes ranging from approximately 0.0001 to 0.0002 inches (approximately 3 to 5 microns). As a result of the improved grain structure, the friction stir weld joint resists formation and propagation of micro-cracks and exhibits improved strength, ductility, toughness, and improved corrosion and fatigue resistance.

During a friction stir welding process, load cells inherent to the system must be tested off-line periodically to verify their accuracy. These tests usually check stir welding loads one axis at a time in either axial or radial load directions. The load cells on the machine are then recalibrated to meet the calibrated cells. This can be very time consuming, and results do not necessarily correlate to the anticipated loads of a particular welding process program.

Thus, there is a need for improved methods and apparatus for friction stir welding and, in particular, for stir welding load confirmation.

The disadvantages associated with current load confirmation tools have made it apparent that a new technique for stir welding confirmation is needed. The new technique should verify path and anticipated program loads before an actual friction stir welding tool is embedded in a material undergoing welding or joining.

SUMMARY OF THE INVENTION

In accordance with one embodiment of the present invention, a load confirmation tool includes a housing having a tip end and an adaptor end. The adaptor end couples to a friction stir welding machine tool holder. A ball extends at least partially from the tip end and rotates relative thereto. In response to forces applied to the ball as a function of its rotation, a load cell generates load signals.

In accordance with another embodiment, a friction stir welding load confirmation system for analyzing a material to be welded includes a friction stir welding machine having a spindle. Coupled to the spindle is a tool holder, which holds an adaptor end of a housing (also having a tip end). The housing retains a ball transfer unit therein, which includes a ball extending at least partially from the tip end thereof. The ball transfer unit further includes a plurality of ball bearings and a transfer unit, whereby the ball bearings rotate as a function of rotation of the ball, whereby force exerted on the transfer unit from the ball pushes against a load cell. The load cell, also retained within the housing, generates load signals as a function of movement of the ball along a preprogrammed three-dimensional path on the material to be welded. A controller receives the load signals and converts the load signals to a digital readout for comparison with friction stir welding machine load requirements, whereby the friction stir welding machine load requirements may correspond to airplane industry standards for weld joint strength of airplane panels The present invention simulates the program path dynamics in the axial force direction verifying the preprogram loads of the computer numerical control (CNC) program. The present invention may therefore function as a program tryout tool for verifying path and anticipated program loads before an actual friction stir welding tool is embedded in the material to be welded or joined.

Additional advantages and features of the present invention will become apparent from the description that follows and may be realized by the instrumentalities and combinations particularly pointed out in the appended claims, taken in conjunction with the accompanying drawings.

BRIEF DESCRIPTION OF THE DRAWINGS

For a complete understanding of the invention, there will now be described some embodiments thereof, given by way of example, reference being made to the accompanying drawings, in which.

DETAILED DESCRIPTION

Figure 1:
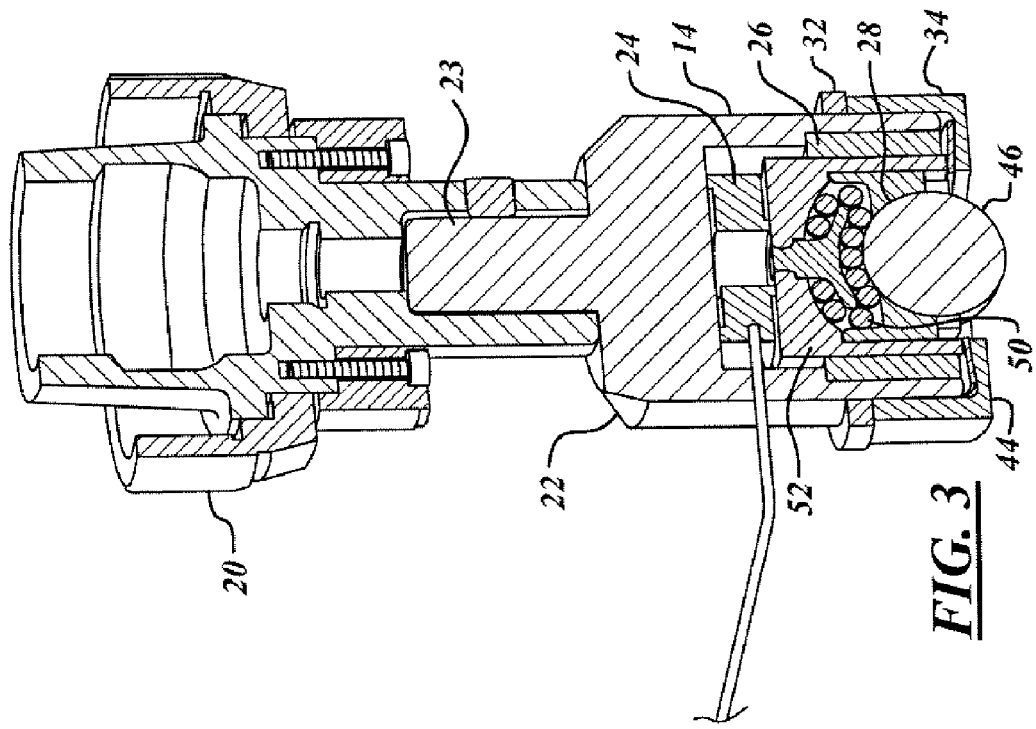
FIG. 1 is a partial cutaway view of a friction stir welding system including a load confirmation tool in accordance with one embodiment of the present invention.

The present invention is illustrated with respect to a load confirmation system 10 including a friction stir welding machine 12 and a stir welding confirmation tool 14, particularly suited to the aerospace field. The present invention is, however, applicable to various other uses that may require welding of various materials together, as will be understood by one skilled in the art. In each of the following figures, the same reference numerals are used to refer to the same components.

Figure 3:
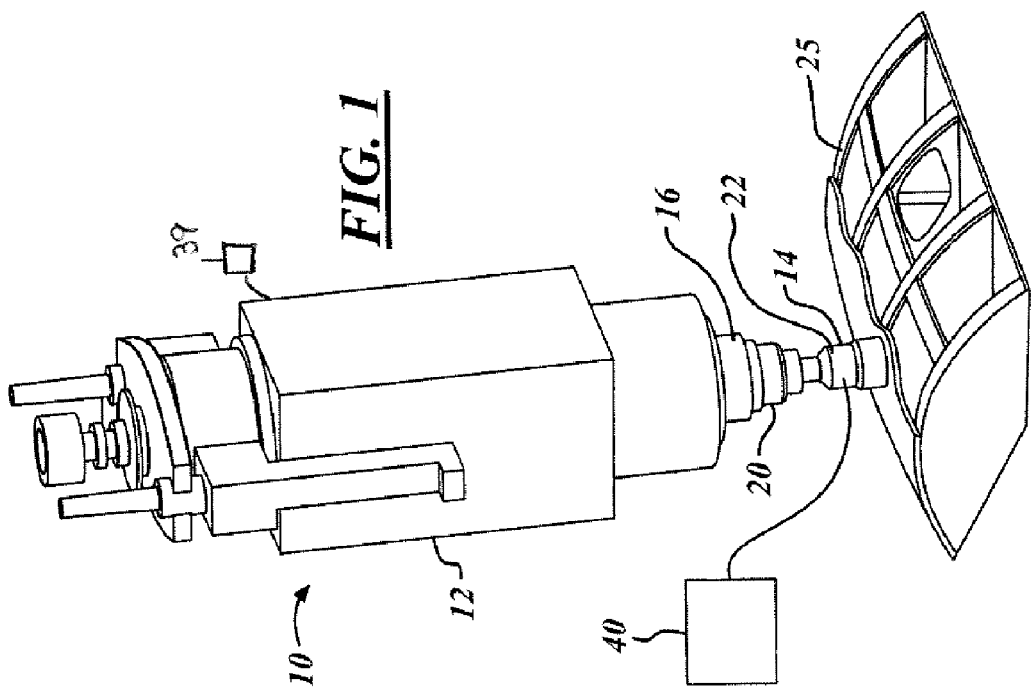
FIG. 3 is a sectional view of the load confirmation tool of FIG. 2.
Figure 2:
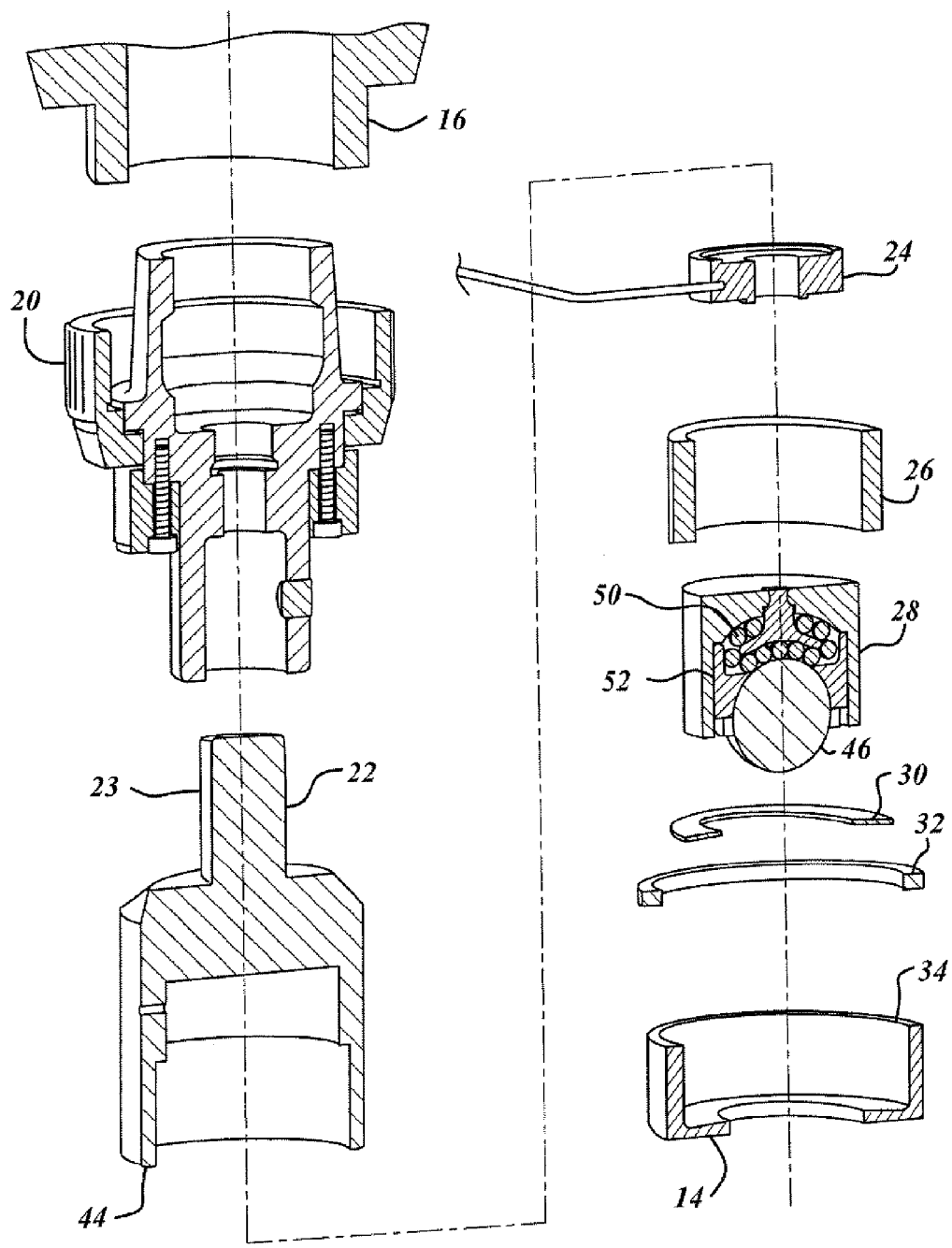
FIG. 2 is an exploded view of a load confirmation tool in accordance with another embodiment of the present invention.

Referring to FIGS. 1-3, the load confirmation system 10 includes the stir welding machine 12 having a stir welding machine spindle 16. The confirmation tool 14, mentioned above, couples to a tool holder 20 for coupling to the stir welding machine spindle 16 and supporting a housing 22. The housing 22 includes an adaptor end 23, for coupling to the stir welding machine 12, and a tip end 44, for contacting materials to be welded 25. The housing 22 encloses an internal load cell 24, a bushing 26, a ball transfer unit 28, a spring washer 30, a lock nut 32, and a retainer nut 34. The stir welding machine 12 sends and receives signals from a computer numerical control (CNC) controller 39; and the load confirmation tool 14 sends and receives signals from a digital readout and data logger, herein referred to as controller 40. Important to note is that the CNC controller 39 and the controller 40 may be included in a single unit or may be separate units as illustrated.

The housing 22 or adaptor is generally cylindrical in shape and includes the adaptor end 23 sized to couple to a standard stir welding machine tool holder. Generally, the housing 22 holds or retains the load cell 24 in contact with the ball transfer unit 28 through an annular bushing 26 substantially surrounding the ball transfer unit 28. The ball transfer unit 28 is retained within the housing 22 through the spring washer 30, the lock nut 32, and the retainer nut 34, as will be understood by one skilled in the art. The tip end 44 of the housing 22 includes the retainer nut 34, which holds the ball transfer unit 28 in place while allowing the ball 46 of the ball transfer unit 28 to protrude therefrom.

As mentioned, the housing 22 retains the ball transfer unit 28 therein. The ball transfer unit 28 includes a ball 46 extending at least partially from the tip end 44. The ball transfer unit 28 further includes a plurality of ball bearings 50 and a transfer unit 52, whereby the ball bearings 50 rotate as a function of rotation of the ball 46, whereby force exerted on the transfer unit 52 from the ball 46 pushes against the load cell 24. The transfer unit 52 includes a bowl shape receiving the ball 46, such that, regardless of the direction of force applied to the ball, the transfer unit 52 is pushed upward in an axial direction.

The load cell 24, also retained within the housing 22, generates load signals as a function of forces exerted on the ball 46 along a preprogrammed path on the material to be welded. In other words, as the ball 46 pushes against the bearings 50, the bearings or the transfer unit 52 push axially against the load cell 24, thereby generating the load signals. The load signals are received within the controller 40, which converts the load signals to a digital readout for comparison with friction stir welding machine load requirements.

The portable multi-axis load confirmation tool 14 follows a three-dimensional machine program path with the rotating ball 46 on the end of the tool 14. The ball 46 reacts the internal load cell 24 for verifying weld program path dynamics before the actual program is run with friction stir welding tools (not shown). The load cell 24 connects to instrumentation electronics in the controller 40 where a signal therefrom can be converted to a digital readout and can then be compared to the program load requirements. The tool 14 integrates into a standard friction stir welding machine spindle tool holder 20, where it is loaded on a friction stir welding spindle 16 for simulating an actual friction stir welding tool.

The tool 14 traces the preprogrammed path as a function of signals from the controller 40, thereby providing a quick but accurate method of verifying that system load cells (not shown) are functioning properly. The present invention verifies that the actual traversing loads and load combinations, as seen at a control station or controller 40, are the same loads required by the program run therein.

The present invention includes a friction stir welding multi-axis load confirmation tool 14 inserted into the end of a stir welding machine 12. The tip 44 of the tool 14 includes a reciprocating ball 46 within a ball transfer 28 connected to a load cell 24 that, when controlled by the controller 40, traces the program path set forth for the actual stir weld tool. The load cell and reciprocating ball combination measure the axial load of the program path through the controller 40. The controller 40 or a tool user compares the accumulated data to the anticipated loads of the stir weld program. As loads are applied to materials to be joined, integrity of those materials is also tested, and a break in the materials may be detected through unexpected or sudden variations in detected load as compared to anticipated load.

The stir welding machine 12 includes a spindle 16 or rotation drive apparatus, for rotating the rotary body, a frame stand, a rail member (not shown) on which the spindle moves freely, and a drive apparatus (not shown) for reciprocating the rotation drive apparatus in a horizontal direction. The spindle 16 is installed on the frame stand and is connected to the rotation drive apparatus through a joint member. One skilled in the art will realize that the rotation drive apparatus includes an electric drive motor and a reduction gear arrangement. Generally, the CNC controller 39 controls movement of the spindle 16.

Signals from the stir welding machine 12 and the load cell 24 are received and processed in, for example, a CNC controller 39. The CNC controller 39 controls the mechanical operations of the stir welding machine 12. In other words, the CNC controller 39 initiates and terminates the flow of current to the spindle 16 and receives feedback signals therefrom. The CNC controller 39 also monitors and measures axial force, radial force, and torque allowing a user to define upper and lower limits for each. The embodied friction stir welding process is run in load control; and the key process parameters, tool rotation rate and traverse speed, are kept constant through the CNC controller 39.

In operation, a portable multi-axis load confirmation tool 14 having a rotating ball 46 on the end thereof follows a three-dimensional weld program path on two pieces of material to be welded, which may be the outer skin of an aircraft or any other aircraft portion to be welded. As the tool moves, the ball 46 reacts the internal load cell 24 for verifying weld program path dynamics before an actual program is run with friction stir welding tools. The load cell 24 is connected to instrumentation electronics converting a load cell signal to a digital readout and comparing the load cell signal to weld program load requirements. The tool integrates into a tool holder 20 loaded on a friction stir welding spindle 16 for simulating an actual friction stir welding tool.

From the foregoing, it can be seen that there has been brought to the art a new load confirmation system. The system is particularly suited to the manufacture of airplanes as precision in welding airplane panels is essential for the lifespan and safety thereof. It is to be understood that the preceding description of one embodiment of the present invention is merely illustrative of some of the many specific embodiments that represent applications of the principals of the present invention. Numerous and other arrangements would be evident to those skilled in the art without departing from the scope of the invention as defined by the following claims.

What is claimed is:

1. A load confirmation tool comprising: a housing comprising a tip end and an adaptor end, said adaptor end adapted to couple to a friction stir welding machine tool holder; a ball extending at least partially from said tip end and rotatably coupled therewithin; and a load cell generating load signals as a function of load force applied to said ball.

2. The system of claim 1, further comprising a controller receiving said load signals and checking whether transversing loads and load combinations provided by said load signals match loads required by a stir welding program.

3. The system of claim 1 further comprising a controller receiving said load signals and converting said load signals to a digital readout for comparison with friction stir welding machine load requirements.

4. The system of claim 3, wherein said controller monitors and measures at least one of axial force, radial force, and torque.

5. The system of claim 4, wherein said controller allows a user to define upper and lower limits for at least one of said axial force, radial force, and torque.

6. The system of claim 3, wherein said controller maintains constant process parameters, tool rotation rate, and traverse speed of the tool.

7. The system of claim 3, wherein said controller simulates program path dynamics in an axial force direction relative to a load conformation tool and verifies preprogram loads of a controller numerical control program.

8. The system of claim 1 further comprising a ball transfer unit retained within said housing comprising a plurality of ball bearings and a transfer unit.

9. The system of claim 8, whereby said ball bearings rotate as a function of rotation of said ball, whereby force exerted on said transfer unit from said ball pushes against said load cell.

10. The system of claim 9, wherein said force exerted on said ball bearings and said transfer unit from said ball comprises an axial force thereby pushing axially against said load cell.

11. The system of claim 1, wherein integrity of materials to be joined is tested through said load force applied to said ball on said materials to be joined.

* * * * *